United States Patent [19]

Yoo

[11] Patent Number: 5,532,559
[45] Date of Patent: Jul. 2, 1996

[54] APPARATUS FOR AND METHOD OF PROVIDING CONTINUOUS DRIVING CURRENT TO A COMMUTATORLESS MOTOR

[75] Inventor: Han-Ju Yoo, Kwangmyung, Rep. of Korea

[73] Assignee: Samsung Electronics Co., Ltd., Suwon, Rep. of Korea

[21] Appl. No.: 355,195

[22] Filed: Dec. 8, 1994

[30] Foreign Application Priority Data

Dec. 8, 1993 [KR] Rep. of Korea ............... 93-26913

[51] Int. Cl.[6] .................................................. H02P 7/00
[52] U.S. Cl. ............................................. 318/254; 318/439
[58] Field of Search ............................ 318/254, 439, 318/138

[56] References Cited

U.S. PATENT DOCUMENTS

| | | | |
|---|---|---|---|
| 4,472,664 | 9/1984 | Chung. | |
| 4,514,667 | 4/1985 | Sakmann et al. | 318/254 |
| 4,720,663 | 1/1988 | Welch et al. | 318/439 X |
| 4,874,993 | 10/1989 | Tanaka et al. | 318/254 |
| 4,897,583 | 1/1990 | Rees | 318/254 |
| 5,019,756 | 5/1991 | Schwarz | 318/254 |
| 5,206,567 | 4/1993 | Sakurai et al. | 318/254 |
| 5,221,881 | 6/1993 | Cameron | 318/254 |
| 5,233,275 | 8/1993 | Danino | 318/254 |

*Primary Examiner*—Jonathan Wysocki
*Attorney, Agent, or Firm*—Burns, Doane, Swecker & Mathis

[57] ABSTRACT

The present invention relates to an operation control apparatus and a method for a commutatorless motor by which current flows in at least one of the windings of the motor during driving to maintain a large torque. The operation control apparatus and the method according to the present invention allow pulse signals to be output for driving the commutatorless motor in response to signals output from a revolution establishing unit and a rotor position detecting unit, whereby the pulse signals are output so that the delay time for controlling RPM can be obtained in order to allow the current to flow in one of the windings before the current flowing in another winding of the commutatorless motor is interrupted.

3 Claims, 6 Drawing Sheets

APPARATUS FOR AND METHOD OF PROVIDING CONTINUOUS DRIVING CURRENT TO A COMMUTATORLESS MOTOR

BACKGROUND OF THE INVENTION

1. Field

The present invention relates to an operation control apparatus and method thereof for a commutatorless motor, and more particularly to an operation control apparatus and method thereof for an the commutatorless motor by which the current can flow in at least one of the windings during drive of the commutatorless motor to thereby maintain large torque.

2. Description of the Related Art

Generally, a DC motor is smaller in size and has a higher operating efficiency than an AC motor and is known to have a capacity of continuously variable operation.

However, a brush is used in the DC motor as a switching means in order to supply a DC power source to a rotor, and in case the brush is used, there have been generated disadvantages in that frictional loss resulting from mechanical contacts and the like has occurred.

Therefore, in order to cope with the disadvantages, a commutatorless motor is disclosed, replacing the mechanical switching means with an electronic switching means, which is much applied to various appliances such as a refrigerator, air conditioner and the like, FIG. 1 is a schematic block diagram for illustrating an operation control apparatus of a conventional commutatorless motor, where an operation control apparatus of a commutatorless motor having a two-phase stator winding is disclosed by way of example.

As illustrated in FIG. 1, the operation control apparatus of a conventional commutatorless motor comprises: a rotor position detecting unit 10 for detecting a rotor position in the commutatorless rotor 70; a frequency dividing unit 20 for dividing a pulse signal supplied from the rotor position detecting unit 10; a first pulse distribution unit 30 for utilizing the pulse signal from the frequency dividing unit 20 to thereafter generate n pulse signals having a predetermined phase difference; a revolution establishing unit 50 for generating pulse signals for controlling a revolution of the commutatorless motor according to the pulse signal of the rotor position detecting unit 10; a second pulse distribution unit 40 for utilizing the pulse signals from the first pulse distribution unit 30 to thereafter generate 2n pulse signals and for determining an activated time of each phase field coil of the commutatorless motor 70 according to signals from the pulse signals and from the revolution establishing unit 50; and a switching unit 60 for being operated by the signals output from the second pulse distribution unit 40 to thereafter drive the commutatorless motor 70.

Meanwhile, although not illustrated, a mark corresponding to "1" or "2" in a binary code is attached on each pole, by way of example, the N pole and S pole, of the rotor in the commutatorless motor 70.

In the foregoing structure, the rotor position detecting unit 10 comprises a Hall Sensor and the frequency dividing unit 20 comprises a flip-flop.

FIG. 2 is an output waveform diagram of major parts in the apparatus illustrated in FIG. 1, wherein FIG. 2a is a waveform diagram for illustrating the commutatorless motor 70 rotating at a low speed and FIG. 2b is a waveform diagram for illustrating the commutatorless motor 70 rotating at a high speed.

In FIGS. 2a and 2b, illustrations are drawn to have the same pulse width for the convenience sake.

First of all, FIG. 2a illustrates a pulse waveform detected by the rotor position detecting unit 10 according as the rotor of the commutatorless motor 70 rotates.

The pulse is input to the dividing circuit unit 20 and the revolution establishing unit 50.

The frequency dividing unit unit 20 divides the waveform to thereafter output a pulse as illustrated in FIG. 2b.

The pulse is input to the first pulse distribution circuit 30. The first pulse distribution unit 30 utilizes the pulse, thereby generating a pulse having a predetermined phase difference.

The pulse is illustrated in FIG. 2c.

The first pulse distribution unit 30 outputs the pulse and a pulse as illustrated in FIG. 2b, which are input to the second pulse distribution unit 40, which generates a pulse having a predetermined phase difference by utilizing the aforementioned pulses.

The pulse are illustrated in FIGS. 2d and 2e.

Meanwhile, the revolution establishing unit 50 receives pulses as illustrated in FIG. 2a output from the rotor position detecting unit 10, thereby outputting two pulses for controlling the speed of the commutatorless motor.

In other words, the revolution establishing unit 50 generates a pulse which drops at a falling edge (as illustrated in FIG. 2a) and rises after lapse of a predetermined time t1 to thereafter maintain a high level for a predetermined time T1 (as illustrated in FIG. 2f), and generates a pulse which drops at a rising edge (as illustrated in FIG. 2a) and rises after lapse of the predetermined time t2 to thereafter maintain a high level for the predetermined time T2 (as illustrated in FIG. 2g).

The pulse generated at the revolution establishing unit 50 is input to the second pulse distribution unit 40.

The second pulse distribution unit 40 logically multiplies the pulse generated at the revolution establishing unit 50 by the pulses illustrated in FIGS. 2b, c, d and e to thereafter output the same.

In other words, the pulse in FIG. 2b is logically multiplied by the pulse in FIG. 2f, the pulse in FIG. 2c logically multiplied by the pulse in FIG. 2f, the pulse in FIG. 2b logically multiplied by the pulse FIG. 2g and the pulse in FIG. 2c logically multiplied by the pulse in FIG. 2g, to thereafter output the pulses as illustrated in FIGS. 2h, i, j and k, which are all input to the switching unit 60.

The switching unit 60 generally comprises transistors (not shown) and the transistors are turned on when the pulses in FIGS. 2h, i, j and k are in high levels, whereas the current flows in the windings of the commutatorless motor 70.

At this time, rotating speed of the commutatorless motor 70 is enabled by varying low level or high level time (t1) (t2) a (T1) (T2) of the pulses output from the revolution establishing unit 50 as illustrated in FIGS. 2f and 2g.

In the operation control apparatus of the conventional commutatorless motor thus constructed, no problem occurs in the case of the rotational speed of the commutatorless motor 70 being at high speed as illustrated in FIG. 2b because the current flows at least in one of the windings. However, a problem occurs in the case of the rotational speed being at low speed as illustrated in FIG. 2a because no current flows in the windings.

In other words, the rotor on the commutatorless motor should be rotated by inertia at a portion where the current does not flow at the winding, which causes a problem in that torque thereof becomes weak.

Accordingly, the present invention has been disclosed to solve the aforementioned problem, and it is an object of the present invention to provide an operation control apparatus of a commutatorless motor by which the current can flow at least in one of the windings for larger torque.

It is another object of the present invention to provide an operation control method of a commutatorless motor by which the current can flow at least in one of the windings for larger torque.

In accordance with one aspect of the present invention, there is provided an operation control apparatus of a commutatorless motor, the apparatus comprising: a rotor position detecting unit for detecting a rotor position of the commutatorless motor; a revolution establishing unit for controlling revolution of the commutatorless motor; a microprocessor for outputting pulse signals for driving the commutatorless motor according to signals output from the rotor position detecting unit and revolution establishing unit while the pulse signals have a predetermined delay time for controlling revolution per minute (RPM) and the delay time has a time for causing the current to flow in another winding before the current flowing in one of the windings of the commutatorless motor is interrupted; and a switching unit for being turned on by the pulse signals output from the microprocessor to thereby cause the current to flow in the windings of the commutatorless motor or to cause the current to stop flowing in the windings for driving of the commutatorless motor.

In accordance with another aspect of the present invention, there is provided an operation control method of the commutatorless motor, the method comprising: a first step for discriminating whether or not the commutatorless motor is driven and for outputting a predetermined initial driving signal according to position of the rotor when the commutatorless motor is under an initial driving state, to thereafter drive the brushless motor; a second step for outputting a driving signal having a predetermined delay time for controlling RPM to thereafter drive the commutatorless motor; third step for controlling the delay time in order to make it possible for the current to flow in another winding before the current flowing in one of the windings on the commutatorless motor operated by the driving signal is interrupted.

BRIEF DESCRIPTION OF THE DRAWINGS

For fuller understanding of the nature and objects of the invention, reference should be made to the following detailed description taken in conjunction with the accompanying drawings in which:

FIGS. 2a through 2k are output waveform diagrams of major parts in the apparatus illustrated in FIG. 1;

DETAILED DESCRIPTION

A preferred embodiment of the present invention will now be described in detail with reference to the accompanying drawings.

Figure 1:
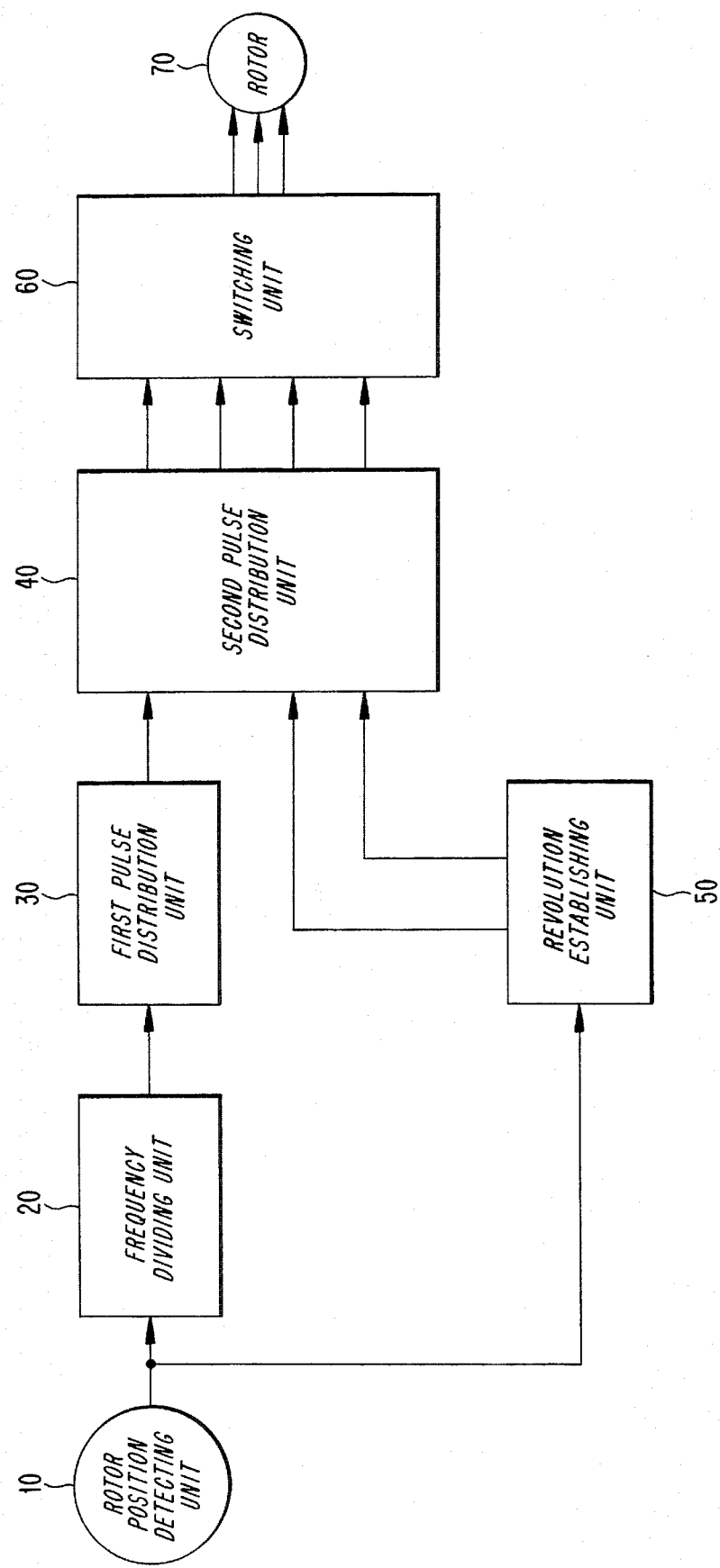
FIG. 1 is a schematic block diagram for illustrating an operation control apparatus of a conventional commutatorless motor.
Figure 3:
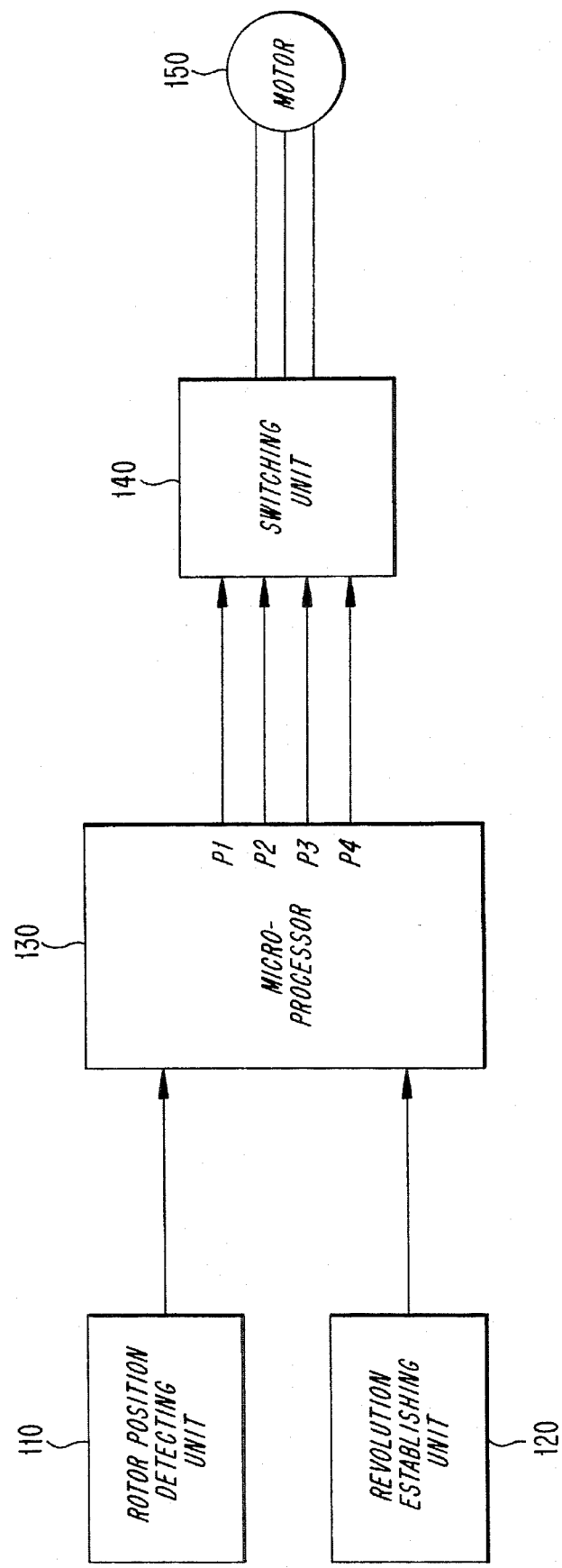
FIG. 3 is a schematic block diagram for illustrating the operation control apparatus of a commutatorless motor according to the present invention.

FIG. 3 is a schematic block diagram for illustrating the operation control apparatus of the commutatorless motor according to the present invention.

As illustrated in FIG. 3, the operation control apparatus of a brushless motor according to the present invention comprises: a rotor position detecting unit 110 for detecting a rotor position at the commutatorless motor 150; a revolution establishing unit 120 for controlling revolution of the commutatorless motor 150; a microprocessor 130 for outputting pulse signals for driving the commutatorless motor 150 according to signals output from the rotor position detecting unit 110 and revolution establishing unit 120 while the pulse signal has a predetermined delay time for controlling revoultion per minute (RPM) and the delay time has a time for flowing the current in another winding before the current flowing in one of the windings of the commutatorless motor 150 is interdicted; and a switching unit 140 for being turned on by the pulse signals output from the microprocessor 130 to thereby cause the current to flow in the winding of the commutatorless motor 150 or to cause the current to stop flowing in the windings for driving of the commutatorless motor 150.

The commutatorless motor is embodied to have a two-phase winding, so that each respective winding is connected with a pair of transistors (not shown).

Furthermore, the rotor of the commutatorless motor 150 has a mark corresponding to each pole as mentioned in the foregoing, and reading the mark enables the present position of each pole on the rotor to be recognized.

The revolution establishing unit 120 is needed to establish the revolution of the commutatorless motor 150 from outside the apparatus. However, as circumstances require, the revolution can be calculated by itself from the microprocessor 130 according to various variables.

Figure 4A:
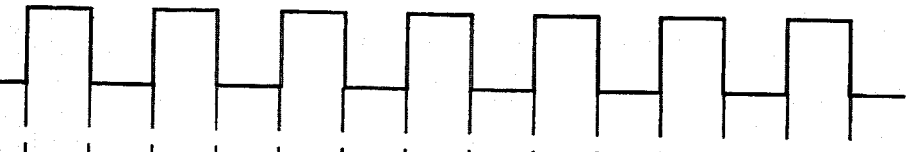
FIGS. 4a through 4e are output waveform diagrams of major parts in the apparatus illustrated in FIG. 3.

Accordingly, in FIG. 3, when the commutatorless motor 150 is rotated, the rotor position detecting unit 110 outputs a pulse of waveform as illustrated in FIG. 4a.

The pulse is thereafter input to the microprocessor 130.

The microprocessor 130, according to the pulse signal output from the rotor position detecting unit 110 detects a revolution state of the commutatorless motor 150, according to which, a signal for driving the commutatorless motor 150 is output.

In other words, when the waveform shown in FIG. 4a is input, the waveform therein is operated, to thereby generate pulses having a predetermined phase difference as illustrated in 4b, c, d and e, so that the same can be output to the switching unit 140.

At this time, the pulses of the predetermined phase difference are the waveforms having a delay time as long as "A", in order to maintain RPM controlled by the revolution establishing unit 120.

At this location, the delay time (A) should be designated shorter than a low or high section ("X" or "Y" section) of the waveform output from the rotor position detecting unit 110.

If the delay time (A) is established longer than the low or high section of the waveform output from the rotor position detecting unit 110, the commutatorless motor 150 is rotated to predetermined 90 degrees and balanced degrees are rotated according to inertia, which makes the torque thereof reduced as much.

In other words, because there occurs a time difference from a moment the current does not flow in one of the windings in the commutatorless motor 150 to a moment the current flows in the other winding in the commutatorless motor 150, the rotor is rotated by the inertia between the two moments.

Therefore, if the delay time (A) has been established for long, the same is now reestablished to have a shorter time gradually, so that a waveform by which at least one of the windings can be excited can be generated.

Figure 4B:
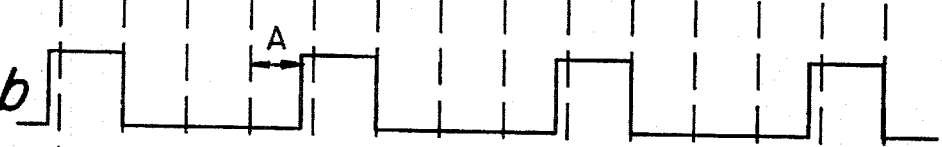

The switching unit 140 is turned on in response to the pulses illustrated in FIGS. 4b, c, d and e input from the microprocessor 130, thereby driving the commutatorless motor.

Figure 5A:
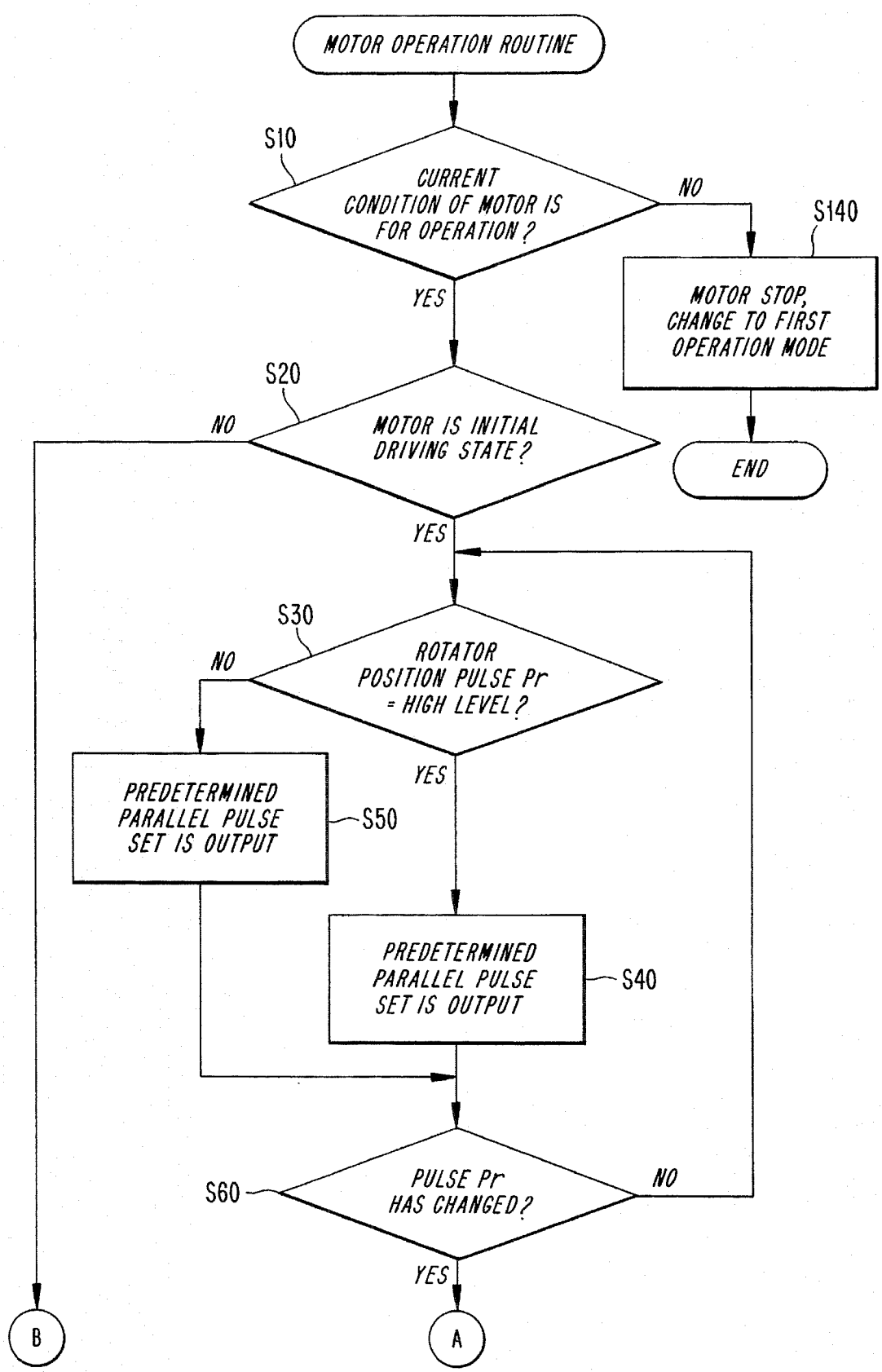
FIGS. 5A and 5B are flow charts for illustrating an operation control method of the commutatorless motor according to the present invention.
Figure 5B:
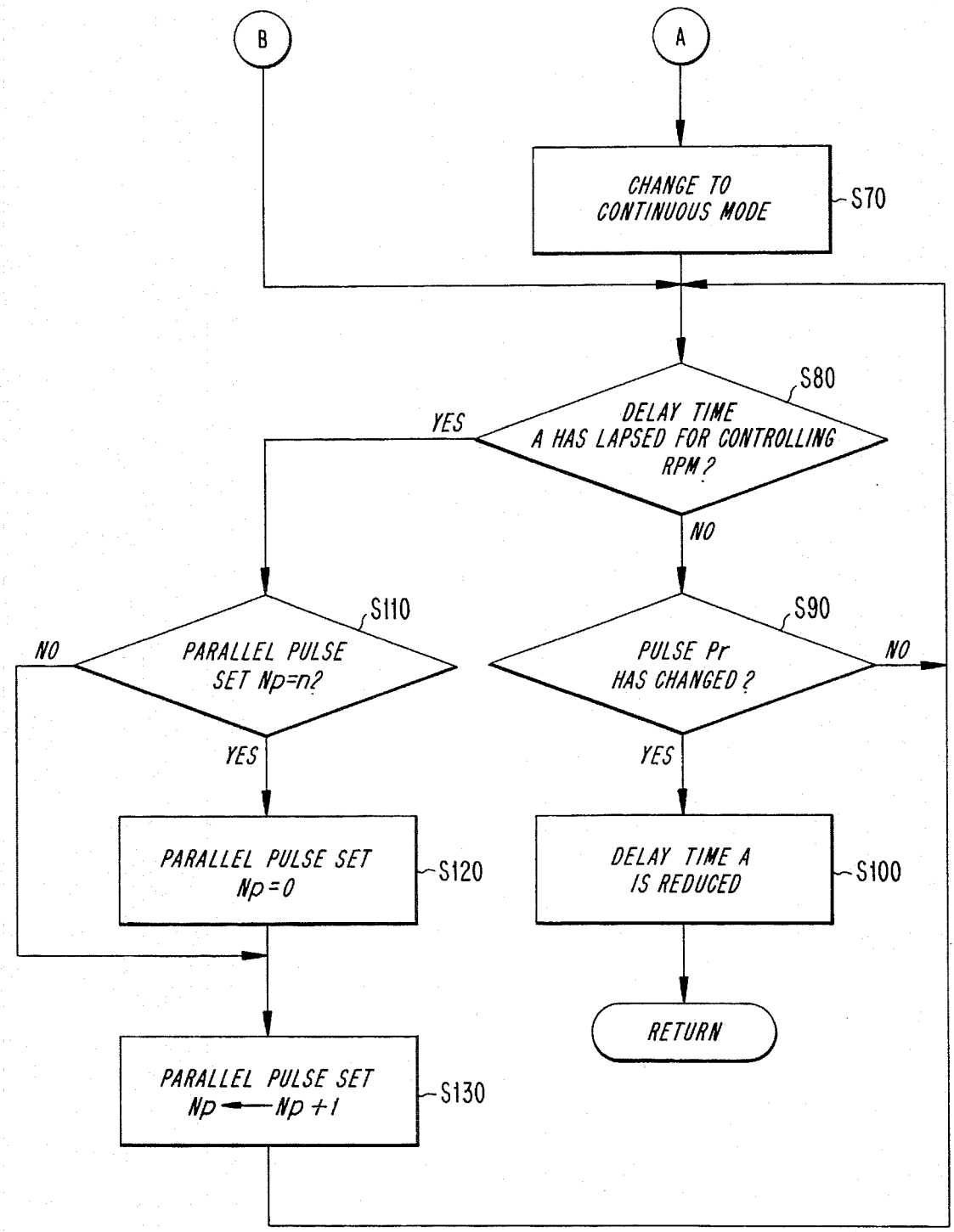

Hereinafter, the operation control method of the commutatorless motor will be described in detail with reference to the flow chart shown in FIG. 5.

At step 10, S10, it is discriminated whether the commutatorless motor 150 should be operated.

By way of example, in case the commutatorless motor 150 is applied to a compressor of a refrigerator, it is discriminated whether the compressor should be operated due to temperature rising in the refrigerator.

When it is discriminated at step S10 that a current condition is not for operation of the commutatorless motor 150, the motor 150 is stopped and at the same time, is changed an initial driving mode.

When it is discriminated that the current condition is for the operation of the motor 150, discrimination is made as to whether or not the motor 150 is under the initial driving state, step, S20.

At step S40, a predetermined parallel pulse set (Np) is output in order for the winding in a corresponding position to be excited to S or N pole. (S pole in the present embodiment).

By way of example, pulses of "1001" are output in parallel to output ports (P1, 2, 3 and 4) of the microprocessor 130.

As a discrimination result at step S30, if the output pulse (Pr) from the rotor position detecting unit 110 is in low level, it is discriminated that the current pole of the rotor is S pole, and flow advances to step S50, outputting the predetermined pulse set (Np) pre-stored in the microprocessor 130.

By way of example, pulses of "1001" are output in parallel to the output ports (P1, 2, 3 and 4) of the microprocessor 130.

At this location, the parallel pulse set (Np) for forming alternate magnetic field at the windings is stored in the microprocessor 130, so that the rotor of the commutatorless motor 150 can be rotated sequentially at every predetermined angle.

As a result of the discrimination at step, S20, if the commutatorless motor 150 is not in the initial driving state, it is discriminated that the driving mode is a continuous mode, and flow proceeds to perform operations subsequent to step S80.

If the commutatorless motor 150 is discriminated to be in the initial driving state as a result of the discrimination at step S20, position (kind of the pole) of the rotor is discriminated by the rotor position discriminating unit 110 at step S30.

In other words, at step S30, discrimination is made as to whether an output pulse (Pr) from the rotor position detecting unit 110 is maintaining a predetermined level (high level in the present embodiment).

As a result of the discrimination at step S30, if the output pulse (Pr) from the rotor position detecting unit 110 is in high level, it is discriminated that the current pole of the rotor is N or S pole, thereby causing step S40 to be executed.

By way of example, "1001" is prestored for a first pulse set, "0101" for a second pulse set, "0110" for a third pulse set and "1010" is prestored for a fourth pulse set.

Meanwhile, the pulses thus output are input to the switching circuit unit 140, which is operated by the pulses to thereby drive the commutatorless motor 150.

A discrimination is made at step S60 as to whether the rotor has been rotated by execution of the step (S40 or S50).

In other words, rotation of the rotor is discriminated by discrimination as to whether there is any change on state of the pulse (Pr) output from the rotor position detecting unit 110, the pulse as being illustrated in FIG. 4a.

If the rotor has not been rotated according to the aforesaid discrimination result, which is a case where the state of the pulse (Pr) output from the rotor position detecting unit 110 has not changed, flow returns back to step S30, thereby trying a re-driving.

If it is discriminated at step S60 that the pulse (Pr) has changed in the state thereof, which implies that the commutatorless motor 150 has started driving, an operation mode of the commutatorless motor 150 is changed to the continuous mode at step S70 for execution of step S80.

Discrimination is made at step S80 as to whether the delay time (A) has elapsed for controlling RPM of the commutatorless motor 150.

In other words, the microprocessor 130 receives revolution (fast, intermediate or slow) established by the revolution establishing unit 120 to thereby calculate activated time of each winding at the commutatorless motor 150, and the delay time (A) is thereupon determinated.

From the foregoing, if it is discriminated that the delay time (A) has not elapsed, discrimination is made at step S90 as to whether the pulse (Pr) has changed in the state thereof.

Figure 4C:
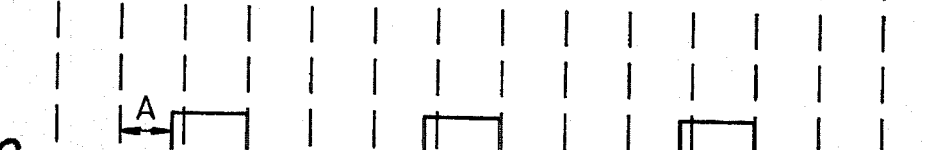
Figure 4D:
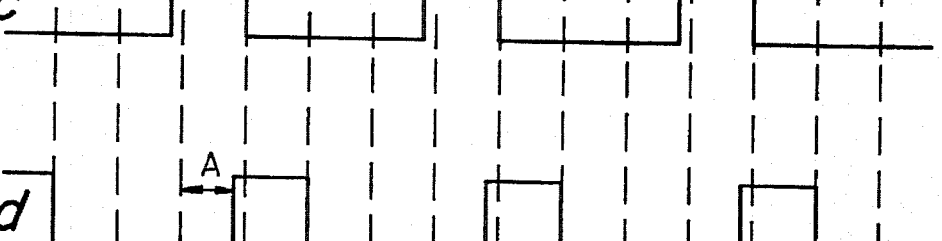
Figure 4E:
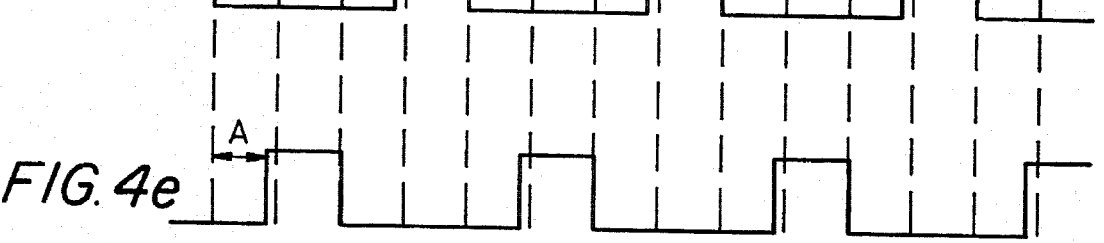

In other words, the parallel pulse set of "1001" is output in the "X" section of FIG. 4, and at this time, the pulse shown in FIG. 4e is output with the predetermined delay time (A) according to the revolution of the commutatorless motor 150, while, discrimination is made as to whether the pulse signal (Pr) shown in FIG. 4a has changed in the state thereof before lapse of the delay time (A).

If the pulse shown in FIG. 4a is changed in its state before the lapse of the delay time (A) in the course of execution of steps S80 and S90, the delay time (A) is reduced at step S100.

In other words, in case there is a state change of the pulse (Pr) before the delay time A lapses, which indicates that the current does not flow in any of the windings of the commutatorless motor 150, the commutatorless motor 150 is driven by inertia at this time.

Accordingly, the delay time (A) is reduced by a predetermined time unit, by way of example 1 msec, to thereafter perform step S80.

As a result of the discrimination at steps S80 and 90, if there is no state change of the pulse (Pr) shown in FIG. 4a even though the delay time (A) has elapsed, it implies that the current flows at least in one of the windings during the operation of the commutatorless motor 150.

The respective pulse sets (Np) pre-stored in the microprocessor 130 are sequentially output at steps S110 through S130 to thereby rotate the commutatorless motor 150.

As seen from the foregoing, the parallel pulse set "0101" is output during "Y" section of FIG. 4, and the pulse shown in FIG. 4c is output with a predetermined delay time (A) established according to the revolution of the commutatorless motor 150, while the delay time (A) is caused to reduce lest the state of the pulse signal (Pr) illustrated in FIG. 4a is changed before lapse of the delay time (A).

Accordingly, the operation control apparatus and the method thereof for the commutatorless motor according to the present invention can achieve an effect in that the current flows at least in one of the windings during operation of the commutatorless motor 150, to thereby increase a rotational torque.

The foregoing description and drawings are illustrative and are not to be taken as limiting.

Still other variations and modifications are possible without departing from the spirit and scope of the present invention.

Specifically, although the aforementioned description has desclosed about a two-phase commutatorless motor, it should be apparent that the present invention can be applied to a commutatorless motor having three-phase windings or more than three-phase windings.

What is claimed is:

1. An operation control apparatus for a commutatorless motor, the apparatus comprising:

rotor position detecting means for detecting a rotor position of the commutatorless motor;

revolution establishing means for controlling revolution of the commutatorless motor;

a microprocessor, responsive to the rotor position detecting means, for determining whether the commutatorless motor is being driven and for outputting a predetermined initial driving signal according to a position of the rotor when the commutatorless motor is in an initial driving state to thereafter drive the commutatorless motor, for outputting a driving signal having a predetermined delay time for controlling motor speed to thereafter drive the commutatorless motor, for controlling the delay time to enable current to flow in a first winding of the commutatorless motor before current ceases to flow in a second winding of the commutatorless motor;

for determining whether the delay time has elapsed for controlling the revolutions per minute of the commutatorless motor;

said delay time is established within a period in a case where there is no change of waveform for detecting the rotor position of the commutatorless motor; and switching means activated by the driving signals output from the microprocessor for controlling the flow of current in the windings.

2. A method of controlling operation of a commutatorless motor, the method comprising the steps of:

discriminating whether or not the commutatorless motor is being driven;

outputting a predetermined initial driving signal according to a position of the rotor when the commutatorless motor is in an initial driving state to thereafter drive the commutatorless motor;

outputting a driving signal having a predetermined delay time for controlling revolutions per minute to thereafter drive the commutatorless motor;

controlling the delay time to enable current to flow in a first winding of the commutatorless motor before current ceases to flow in a second winding of the commutatorless motor;

discriminating whether the delay time has elapsed for controlling the revolutions per minute of the commutatorless motor;

discriminating whether a state of a pulse generated according to rotation of the rotor of the commutatorless motor has been changed when it is discriminated that the delay time has not lapsed;

reducing the delay time when the state of the pulse generated by the rotation of the rotor has been changed before the delay time has lapsed; and rotating the commutatorless motor by outputting sequentially pre-established pulse combination sets when the state of the pulse generated by the rotation of the rotor has not been changed before the delay time has elapsed.

3. A method as defined in claim 2, wherein the delay time is established within a period in a case where there is no change of waveform for detecting the rotor position of the commutatorless motor.

* * * * *